Dec. 29, 1964 J. BORNE ETAL 3,163,489

ELECTROTHERMAL PRINTING OR RECORDING APPARATUS

Filed July 9, 1962 2 Sheets-Sheet 1

INVENTOR
JEAN BORNE
HENRI DORMONT
ROBERT GOUDIN
BY
AGENT

ELECTROTHERMAL PRINTING OR RECORDING APPARATUS

Filed July 9, 1962 2 Sheets-Sheet 2

INVENTOR
JEAN BORNE
HENRI DORMONT
ROBERT GOUDIN
BY
AGENT

United States Patent Office 3,163,489
Patented Dec. 29, 1964

3,163,489
ELECTROTHERMAL PRINTING OR RECORDING APPARATUS

Jean Borne, Saint-Maur, Henri Dormont, Fontenay-sous-Bois, and Robert Goudin, Saint-Maur, France, assignors to North American Philips Company, Inc., New York, N.Y., a corporation of Delaware
Filed July 9, 1962, Ser. No. 208,284
Claims priority, application France, July 11, 1961
10 Claims. (Cl. 346—76)

Modern electronic communications and computing techniques have created a demand for printing or recording apparatus for recording the output information from a communications channel or a computer in the form of signals in a legible or otherwise visually recognizable form on a record carrier at a speed matching that at which the signals become available. The printed or recorded information may take the form of discrete symbols (letters, numerals and other characters) or may consist of one or several graphs, one of the axes of which may be a time axis.

Electromechanical printing apparatus is known wherein the electric signals energize electromagnetic relays by which a member carrying the symbol to be recorded is physically pressed to the record carrier; however, these are generally too slow for the above mentioned purpose. A higher speed is obtainable by providing the printing or recording apparatus with a single series or a matrix of writing heads; these may be brought in point contact with the record carrier and are adapted to be individually electrically energized so as to cause local indications at a suitable record carrier by electrolytic or thermal action. The term "local" is used herein to denote a particular point or a plurality of points on the record. The assembly of the local indications of the record carrier obtained by sequentially energizing different combinations of writing heads from a single series or a particular combination of writing heads arranged accordng to a matrix forms a legible symbol or mark which, with proper choice of the said combinations or combination, represents the information contained in the electric signals determining this choice.

It is known to design the individually energizable writing heads of printing or recording apparatus of the above mentioned type as electrically conducting pins having tips which bear on the record carrier, a plate-shaped counter-electrode being provided on the other side of the carrier. A recording is made by the passage of current through the record carrier so that heat is produced in the carrier either by arcing or by dielectric heating. The passage of current may also be used to produce a local indication at the record carrier as a result of electrolytic action. It is also known for a writing head of a facsimile apparatus to comprise two electrodes which terminate in a chamber open at the side facing the record carrier and between which, on energization an electric arc is struck whereby the carrier is locally heated. Also known are thermosensitive record carriers which produce local indications by heating at the relevant area and are suited for use in apparatus of the above mentioned kind, in which on energization of a writing head electric energy is converted into heat.

The present invention relates to an electrothermal printing or recording apparatus having at least one series of writing heads arranged on a straight line and adapted to be brought into point contact with a thermosensitive record carrier, the heads being individually electrically energizable so as to heat the record carrier at the contact area. It is an object of the invention to provide an apparatus of this kind which is capable of rapid operation under the control of electric pulses, is simple in construction, requires comparatively little electric energy for energization of the writing heads and has a high degree of mechanical strength.

According to one embodiment of the invention a writing head comprises a thin short strip-shaped conductor which is in electric and heat conducting contact with and forms a bridge between two plate-shaped members arranged in spaced relationship in one plane and consisting of a material of good electric and thermal conductivity; the plate-shaped members constitute current supply members for the tape-shaped conductor thus allowing said conductor to be electrically heated by the passage of current. The width of the strip-shaped conductor is preferably equal to the thickness of the plate-shaped members of a writing head while the plane of the conductor is substantially at right angles to the plane of the plate-shaped members. In a further modification of this embodiment the strip-shaped conductor of a writing head forms a connection between corresponding corners of the plate-shaped members; one pair of corresponding edges of the members which meet at these corners extends substantially at right angles to the longitudinal direction of the strip-shaped conductor and the other pair of corresponding edges extends substantially in the longitudinal direction of the strip-shaped conductor or makes a small angle therewith. This modification permits a series of writing heads to be arranged on a straight line in close proximity to one another by simple means, the plate-shaped members being arranged adjacent and parallel to one another with the interposition of an electrically insulating layer which may be, for example, an insulating foil or a thin mica plate. The assembly may readily be united, for example, by means of a mass of synthetic resin to form one or several blocks each comprising a greater or smaller number of identical writing heads.

The strip-shaped conductor may consist of a short length of self-supporting metal tape, preferably constantan or Nichrome. To reduce to a minimum the electric energy required for energization, in another preferable modification the strip-shaped conductor consists of a strip-shaped metallic layer deposited preferably from the vapour phase, on an electrically insulating material, for example a thermosetting synthetic resin disposed in the interstice between the facing edges of the plate-shaped members. To provide mechanical protection for the strip-shaped conductor produced in this manner, according to a further modification of this embodiment the side of the conductor facing the thermosensitive record carrier may be provided with a thin layer produced by deposition, preferably also from the vapour phase of a material having a comparatively low specific thermal resistance and a comparatively high specific electric resistance. Suitable materials for this thin layer preferably are intrinsic semi-conductors, for example, intrinsic germanium or silicon.

In order that the invention may be readily carried into effect, two embodiments thereof will now be described, by way of example, with reference to the accompanying diagrammatic drawing, in which.

Figure 1:
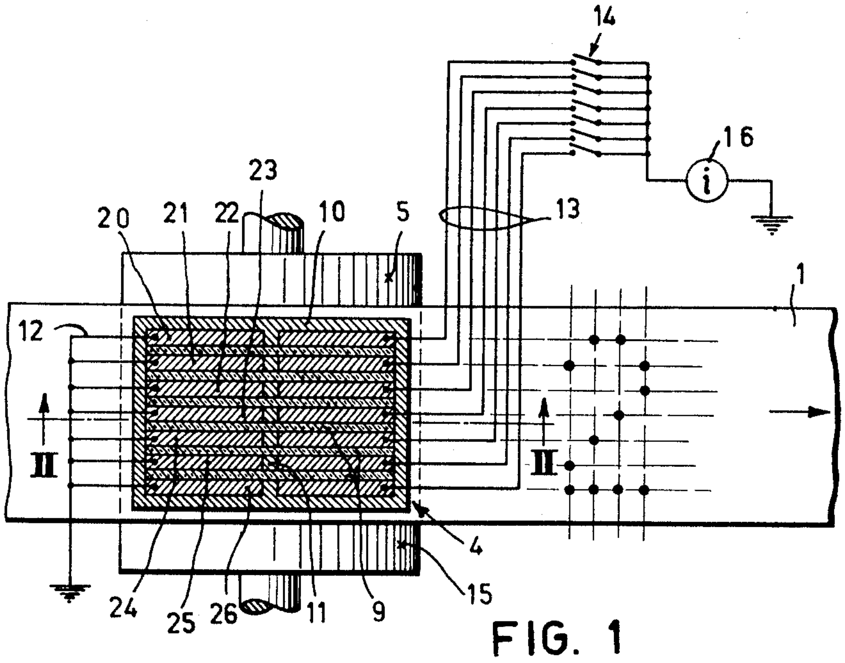
FIGURE 1 is a view part in plan and part sectional taken along the line I—I of FIGURE 2 of an apparatus having five writing heads and adapted to record ciphers on a tape-shaped record carrier.
Figure 2:
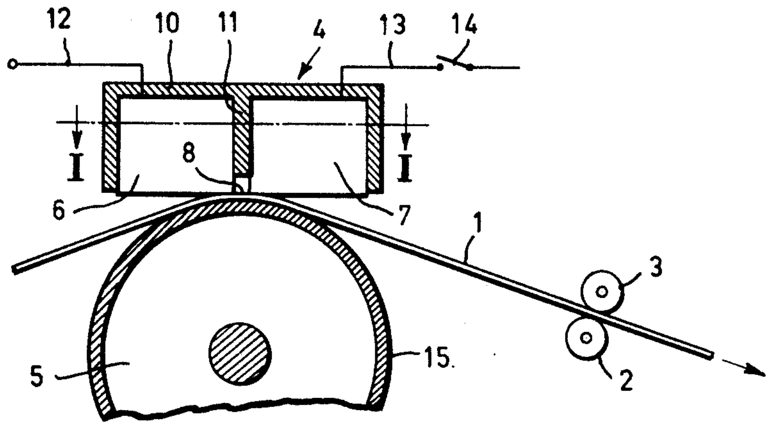
FIGURE 2 shows part of the apparatus of FIGURE 1 in cross-section taken along the line II—II of FIGURE 1.
Figure 3:
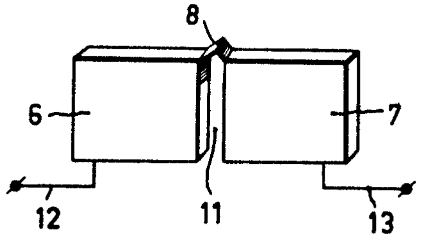
FIGURE 3 is a perspective view of one of the writing heads of the apparatus shown in FIGURES 1 and 2.

FIGURES 1 to 3 show only those parts of the printing or recording apparatus which are required for a clear understanding of the invention. This apparatus is adapted to record on a tape-shaped record carrier 1 consisting of thermosensitive paper symbols or graphs; these comprise a selection of a number of points out of a possible number of seven which lie in a line substantially at right angles to the longitudinal direction of the tape 1. The tape 1 may be passed between a block 4 containing seven identical writing heads 20 to 26 to be described more fully hereinafter and a cylinder 5 rotatable with the aid of a capstan comprising two rollers 2 and 3 one of which is driven. The cylinder 5 is preferably provided at the surface with a layer 15 of a material of poor thermal conductivity, for example, rubber or cured thermosetting resin. The block 4 may be secured to a rotatable arm, not shown, which extends in the longitudinal direction of the tape 1. Each of the writing heads 20 to 26, one of which is separately shown in FIGURE 3 inverted for the sake of clarity, comprises two substantially rectangular metal plates 6 and 7 situated in the same plane and a comparatively short and thin metal strip 8 which bridges a narrow interstice 11 between the facing edges of the plates 6 and 7 and has its ends welded to these plates. The plates 6 and 7 consist of a metal of satisfactory electric and thermal conductivity, for example, copper, while the strip 8 preferably consists of a metal having a comparatively high specific electric resistance, for example, constantan or Nichrome. The strip 8 joins those facing corners of the plates 6 and 7 which are situated nearest the cylinder 5. The writing heads 20 to 26 are arranged parallel and adjacent to one another and are electrically separated from one another by insulating layers 9 which may be foils of synthetic resin or thin glass or mica plates. The assembly comprising the writing heads and the intermediate layers 9 is held together and united to form an integral block 4 by a hardened synthetic resin envelope 10 which surrounds the assembly except for the side facing the cylinder 5 and also fills up the interstice 11 between the plates 6 and 7 of a writing head except for an end portion thereof bridged by the strip 8.

Each strip 8 slightly projects in the direction of the axis of the cylinder 5 so that by exerting a slight pressure on the block 4 in a direction towards the cylinder 5 all the strips 8 in the various writing heads 20 to 26 are placed in substantially point contact with the paper tape 1, the contact areas being situated on a line substantially at right angles to the longitudinal direction of the tape 1.

Each of the strips 8 of the various writing heads 20 to 26 may be heated by the passage of current so that the thermosensitive tape 1 is discolored, i.e., has a local indication placed thereon at the area of contact. To produce this electric energization of the writing heads 20 to 26 each of the plates 6 is provided with a current supply lead 12. These leads are directly connected to each other and to ground. Each of the plates 7 is also provided with a current supply lead 13 which are not directly connected to each other but may be individually connected through a switch 14 to one terminal of a current source 16 whose other terminal is grounded. In FIGURE 1 the switches 14 are symbolically represented as switches adapted to be mechanically closed but it will be appreciated that in actual fact they will generally be electronic switches, for example, transistor, switching tubes or photo-resistors, adapted to be controlled by electric or optical pulses.

When a switch 14 is closed, an electric current starts to flow through the strip 8 of the corresponding writing head, the plates 6 and 7 of this head acting as current supply members for the strip 8. The electric current flowing through the strip 8 produces heat in each cross-sectional area due to the electric resistance. This heat will flow in the longitudinal direction of the strip towards the plates 6 and 7 which have a large heat capacity and a low thermal and electric resistance compared with the strip 8. Due to this low resistance both the electric current density and the thermal current density are small in the plates 6 and 7 so that the electric energy supplied is converted into heat substantially entirely in the tape 8. The electric energy dissipated in the tape 8 causes its temperature to increase by an amount $$\Delta T=\frac{W}{8\Gamma}$$

($W$=electric energy dissipated in joules) with a time constant of $\tau/\pi^2$, where $$\tau=\frac{CL^2}{\gamma}\text{ and }\Gamma=\frac{\gamma S}{L}$$

where $C$=thermal capacity (water equivalent) of the tape 8,
$\gamma$=thermal conductivity of the tape,
$L$=length of the tape, and
$S$=cross-sectional area of the tape.

A strip of constantan having a length of 800 microns between the plates 6 and 7, a width of 600 microns (equal to the thickness of the plates 6 and 7) and a thickness of 100 microns exhibits a temperature rise of about 250° C. from room temperature when energized by 3 watts for 10 milliseconds.

In the embodiment described, the thickness of the plates 6 and 7 is preferably equal to the width of the strip 8 in order to ensure that with adjacent writing heads the local discolourations of the recording tape 1 produced by the strips are not excessively spaced transversely of the said strip. The other dimensions of the plates 6 and 7 are not critical so that, for example, the length and width may vary between 1 and 3 cms; the main point is that when a strip 8 is energized by electric pulses succeeding one another at short intervals the electric energy is converted into heat substantially only in the strip 8 while the dissipation of this heat through the plates 6 and 7 does not raise their temperature appreciably. Thus the plates 6 and 7 act as a heat sink.

Energization of the various writing heads 20 to 26 by electric pulses in a manner such that on the recording tape 1 point discolourations forming a particular desired symbol or mark or a graph are produced, is effected by controlling the switches 14 each time in the correct combination, the recording tape being moved past the recording heads either continously or intermittently. This control of the switches 14 may, for example, be effected with the aid of one or several matrices of magnetic cores made of a material having a rectangular hysteresis loop, in a manner similar to a known method of controlling a series of writing pins or magnetic writing heads co-operating with a record carrier and adapted to be electrically energized with the aid of such matrices (see, for example, Electronics, September 1956, page 146).

In FIGURE 1 the apparatus described has recorded the numeral 2 on the recording tape 1. This numeral is obtained by successive short-time energization of the following four combinations of writing heads 21, 22 and 26; 20, 23 and 26; 20, 24 and 26; 21, 25 and 26 while the tape 1 is intermittently moved in the direction of the arrow. It will be appreciated that by the succession of four combinations any symbol may be recorded which can be formed by selection of an arbitrary number of points from a matrix of 7 times 4 such points. Obviously the use of the apparatus is not restricted to the said number of four successive combinations for each symbol but this number is sufficient for recognizably recording normal ciphers. If letters are also to be recorded five successive combination are preferably used for each character.

Figure 4:
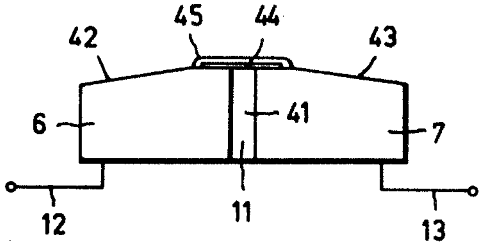
FIGURE 4 is a side elevation of another embodiment of a writing head.

In FIGURES 1 to 3 the strip shaped conductor between the two plates 6 and 7 of a writing head is constituted by a self supporting metal strip 8 the ends of which are secured to these plates. FIGURE 4 shows in side elevation an example of a writing head for an apparatus in accordance with the invention in which the heating strip is obtained by local metallization of an electrically and thermally insulating body.

When the dimensions of a self-supporting strip which in view of its mechanical strength must have a thickness of 50 to 100 microns or even more, are of the order described above with reference to the embodiment of FIG. 3, due especially to its small length its electric resistance will be too low for it to be efficiently fed directly by, for example, a transistor so that in such cases a transformer has to be included and alternating-current feeding has to be used. This is not in itself a disadvantage but to avoid such interposition of a transformer it is desirable for the resistance of the strip-shaped current conductor between the plates of the writing head to be increased. If the dimensions of the discolouration produced on the thermosensitive record carrier on energization of the head are not to become unduly small (a discoloured area of 0.5 by 0.5 mm. being preferred), the resistance of the strip-shaped conductor can only be increased by reducing the thickness thereof. According to a further embodiment of the invention this may be effected by using a heating strip which is not self supporting so that its thickness may, if required, be reduced to a few microns.

In the writing head shown in side elevation in FIGURE 4 which, similarly to the writing heads 20 to 26 of the first embodiment, contains two plates 6 and 7 situated in the same plane and spaced from one another by a narrow interstice 11 having a width of, for example, from 600 to 800 microns, this interstice is entirely filled with insulating material 41, for example, a hardened synthetic resin, for example, an epoxy resin the upper edge of which coincides with and is aligned with the upper edges 42 and 43 of the plates 6 and 7. On this upper edge of the mass 41 and the adjacent portions of the said edges 42 and 43 a heating strip comprising a thin layer 44 of metal or a metal alloy is applied, for example, by deposition from the vapour phase in a vacuum. The layer 44 may consist of Nichrome having a thickness of, for example, from 5 to 20 microns. Because such a thin layer is mechanically vulnerable and hence may give rise to difficulty when being in contact with the thermosensitive record carrier on which a local discoloration has to be produced by the heat generated in the layer 44, this layer 44 is coated with a second, thicker layer 45 consisting of a material having a low electric conductivity but a comparatively high thermal conductivity. This layer 45, having for example, a thickness of 50 microns, may consist of an intrinsic semi-conductor, for example, intrinsic germanium or silicon. The layer 45 may likewise be deposited from the vapour phase; deposition from the vapour phase has the advantage that the thickness of the layer may readily be made uniform, that is readily reproducible and that the likelihood of any adverse influence of impurities is small.

Similarly to the heads 20 and 26 of the first embodiment a plurality of writing heads as shown in FIGURE 4 may be united to form a mechanically integral unit, the plates 6 and 7 of the consecutive writing heads being arranged parallel to one another with the interposition of an insulating layer, while the heating layers 44 each coated with a layer 45 are aligned in a direction substantially at right angles to the plane of the plates. Such a unit may be manufactured by fixing the plates 6 and 7 of the various writing heads in mutually correct positions in a holder so as to be insulated from one another, for example with the aid of a thermosetting synthetic resin, which also fills the space 11 between the plates of a writing head after which the upper surface of the resulting assembly at the areas at which the layers 44 and 45 have to be provided are ground flat and subsequently with the aid of a mask having strip-shaped apertures a number of layers 44 and then on top thereof a same number of layers 45 are formed by deposition from the vapour phase so that each pair of associated layers forms a bridge between two coplanar plates 6 and 7.

Figure 5:
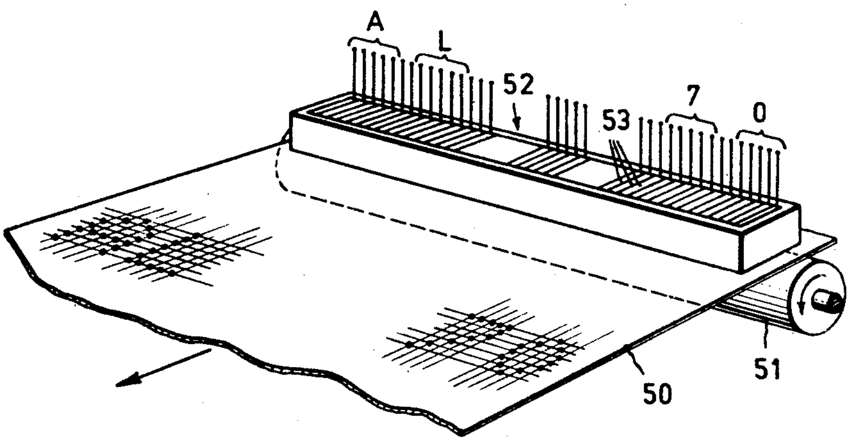
FIGURE 5 illustrates schematically a graphic apparatus in accordance with the invention by which all the symbols of one line may simultaneously be written on a sheet.

FIGURE 5 shows schematically an embodiment of a printing or recording apparatus in accordance with the invention with the aid of which the characters of line running in a direction substantially at right angles to the longitudinal direction of the carrier may be recorded simultaneously on a wide thermosensitive record carrier. A thermosensitive record carrier 50 having the width of a normal sheet is moved between a rotatably mounted roller 51 and a holder 52 extending in the direction of the axis of the roller 51. The holder 52 contains a plurality, for example a number exceeding one hundred, of writing heads 53 arranged parallel to an adjacent one another. The heating strips of these writing heads, which may have the form shown in FIGURE 3 or that shown in FIGURE 4, are arranged on a straight line on the open lower surface of the holder 52 facing the record carrier 50 and each are in point contact with this carrier. The line constituted by these point contact areas extends substantially at right angles to the longitudinal direction of the record carrier 50 through the larger part of its width.

If now in, for example, seven successive periods suitably chosen combinations of heads arranged in groups which each consist of, for example, five writing heads 43 in the holder 52 are simultaneously energized each by an electric pulse, and in the intervals between these periods the carrier 50 is slightly moved, an entire line of characters, for example, of letters or numerals, may be recorded across the width of the carrier 50. In FIGURE 5 this is illustrated by letters A and L and numerals 7 and 0 which are recorded in the same line on the carrier 50. These marks are obtained in the following manner: at seven successive instants a suitable combination of writing heads of each of the four groups marked A, L, 7 and 0, of five heads each in the holder 52 is simultaneously energized by electric pulses each time. After each pulse the carrier 50 is slightly advanced; however, its movement may alternatively be continuous. In the example shown the marks recorded on the carrier 50 each consist of a particular combination of discoloured spots from a plurality of possible discolourations arranged in a matrix of 5 x 7 spots.

The writing heads 53 need not all be accommodated in a single holder 52 extending in the direction of the axis of the roller 51 but this holder may be subdivided in several separate parts which are arranged one behind the other in the direction of the said axis and each comprise a certain number of writing heads. This arrangement provides more certainty that the heating tapes of all the writing heads engage the record carrier 50.

An apparatus of the kind shown in FIGURE 5 may also be used for recording variable quantities, represented by electric signals, in the form of graphs. For this purpose the electric signals may be used for successively supplying an electric pulse to that particular writing head the position of which in the series is a measure of the indicative nature of the signal at the relevant instant, in other words, of the information represented by the signal at the said instant. The series of writing heads may be subdivided in groups, each group being operated by a variable signal representing a particular quantity, so that several quantities may be simultaneously recorded in graphical form. The movement of the record carrier may be either intermittent or continuous such that of the resulting graph the axis which extends in the direction of movement of the record carrier is a time axis, but obviously the speed of the record carrier may also be controlled by a quantity which itself varies with time.

While the invention has been described with respect to various embodiments, other modifications will be readily apparent to those skilled in the art without departing from the inventive concept, the scope of which is set forth in the appended claims.

What is claimed is:

1. An electrothermal printing or recording apparatus including at least one series of writing heads adapted to be brought into point contact with a thermosensitive record carrier, each head being individually electrically energizable to heat the record carrier at the area of contact, each head comprising: two plates consisting of a material having good electrical and thermal conductivity, each of said plates having width, depth and length dimensions, said plates being spaced from each other, a thin short strip-shaped conductor electrically and thermally connected to said plates and bridging the space between them, the width of the strip-shaped conductor being equal to the depth of the plates.

2. An electrothermal printing or recording apparatus including at least one series of writing heads adapted to be brought into point contact with a thermosensitive record carrier, each head being individually electrically energizable at the area of contact, each head comprising: two plates consisting of a material having good electrical and thermal conductivity, each of said plates having width, depth and length dimensions, said plates being co-planar and spaced from each other with the sides having the depth dimension facing each other, each plate having at least one corner formed by the intersection of two sides having width and depth dimensions, said intersection being at an angle no greater than substantially ninety degrees, one such corner of one plate being opposite a similar corner of the other plate, and a thin, short strip-shaped conductor electrically and thermally connected to said oppositely located corners and bridging the space between the plates.

3. An electrothermal printing or recording apparatus including at least one series of writing heads adapted to be brought into point contact with a thermosensitive record carrier, each head being individually electrically energizable at the area of contact, each head comprising: two plates consisting of a material having good electrical and thermal conductivity, each of said plates having width, depth and length dimensions, said plates being co-planar and spaced from each other with the sides having the depth dimension facing each other, each plate having at least one corner formed by the intersection of two sides having width and depth dimensions, said intersection being at an angle no greater than substantially ninety degrees, one such corner of one plate being opposite a similar corner of the other plate, and a thin, short strip-shaped conductor electrically and thermally connected to said oppositely located corners and bridging the space between the plates, the width of the strip-shaped conductor being equal to the depth of the plates, the direction of width of the conductor extending parallel to the direction of depth of the plates.

4. Apparatus according to claim 3, wherein said strip-shaped conductor is self-supporting in said space.

5. An electrothermal printing or recording apparatus including at least one series of writing heads adapted to be brought into point contact with a thermosensitive record carrier, each head being individually electrically energizable at the area of contact, each head comprising: two plates consisting of a material having good electrical and thermal conductivity, each of said plates having width, depth and length dimensions, said plates being co-planar and spaced from each other with the sides having the depth dimension facing each other and forming a gap therebetween, each plate having at least one corner formed by the intersection of two sides having width and depth dimensions, said intersection being at an angle no greater than substantially ninety degrees, one such corner of one plate being opposite a similar corner of the other plate, the sides of said plates having corresponding dimensions being substantially parallel to each other, and a thin, short strip-shaped conductor electrically and thermally connected to said oppositely located corners and bridging the gap between the plates, the width of the strip-shaped conductor being equal to the depth of the plates, the direction of width of the conductor extending parallel to the direction of depth of the plates.

6. Apparatus according to claim 5, wherein said strip-shaped conductor is self-supporting in said gap.

7. An electrothermal printing or recording apparatus including at least one series of writing heads adapted to be brought into point contact with a thermosensitive record carrier, each head being individually electrically energizable at the area of contact, each head comprising: two plates consisting of a material having good electrical and thermal conductivity, each of said plates having width, depth and length dimensions, said plates being co-planar and spaced from each other with the sides having the depth dimension facing each other, each plate having at least one corner formed by the intersection of two sides having width and depth dimensions, said intersection being at an angle no greater than substantially ninety degrees, one such corner of one plate being opposite a similar corner of the other plate, the space between the plates being filled with an electrically and thermally insulating material, and a thin metallic layer deposited on said insulating material electrically and thermally connected to said oppositely located corners and bridging the space between the plates.

8. Apparatus as claimed in claim 7, wherein the surface of said metallic layer facing away from said plates has deposited thereon a material of low specific heat resistance and high specific electric resistance.

9. An electrothermal printing or recording apparatus including at least one series of writing heads adapted to be brought into point contact with a thermosensitive record carrier, each head being individually electrically energizable at the area of contact, each head comprising: two plates consisting of a material having good electrical and thermal conductivity, each of said plates having width, depth and length dimensions, said plates being co-planar and spaced from each other with the sides having the depth dimension facing each other and forming a gap therebetween, each plate having at least one corner formed by the intersection of two sides having width and depth dimensions, said intersection being at an angle no greater than substantially ninety degrees, one such corner of one plate being opposite a similar corner of the other plate, the sides of said plates having corresponding dimensions being substantially parallel to each other, the gap between the plates being filled with an electrically and thermally insulating material, and a thin metallic layer deposited on said insulating material electrically and thermally connected to said oppositely located corners and bridging the gap between the plates.

10. Apparatus as claimed in claim 9, wherein the surface of said metallic layer facing away from said plates has deposited thereon a material of low specific heat resistance and high specific electric resistance.

References Cited in the file of this patent

UNITED STATES PATENTS

| | | |
|---|---|---|
| 1,306,631 | Rogers | June 10, 1919 |
| 1,406,507 | Tuttle | Feb. 14, 1922 |
| 1,901,921 | Means | Mar. 21, 1933 |